United States Patent Office 3,060,711
Patented Oct. 30, 1962

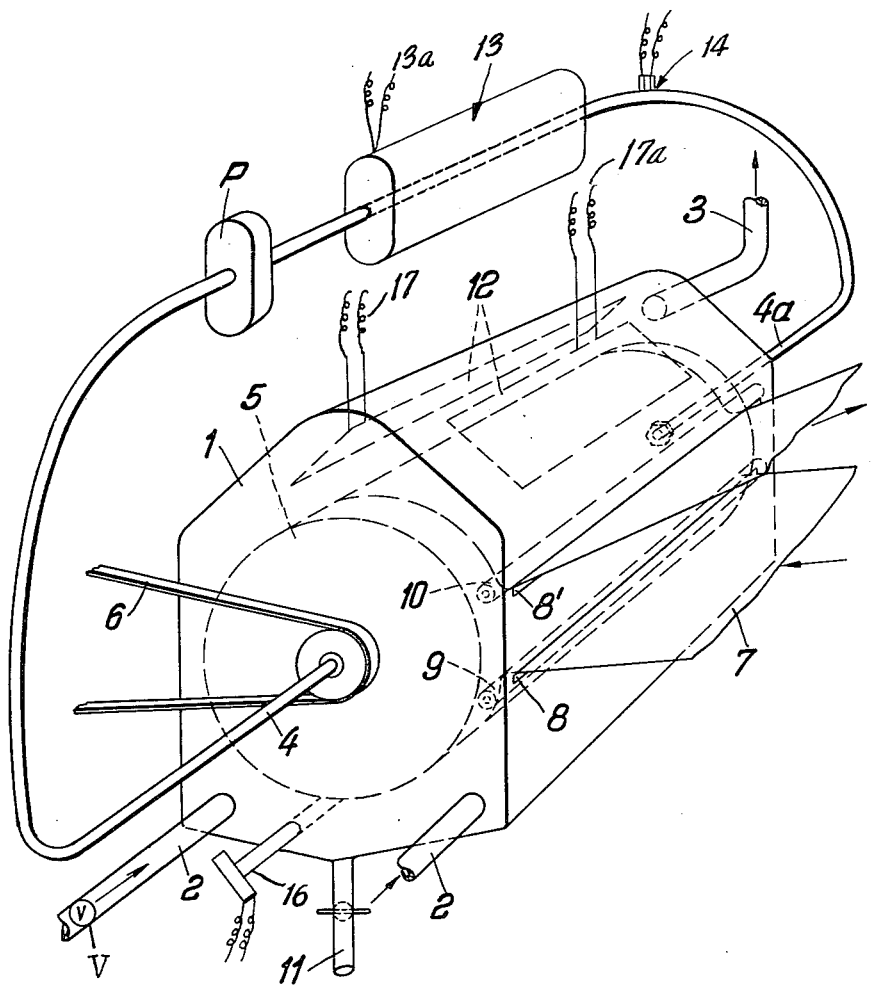

3,060,711
APPARATUS FOR THE CONTINUOUS TREATMENT OF ELONGATED GOODS, MORE PARTICULARLY TEXTILES IN A VAPOR CHAMBER
Willy Walter, Monchen-Gladbach, Germany, assignor to Caspar Monforts von Hobe, trading as the firm A. Monforts, Monchen-Gladbach, Germany
Filed Aug. 26, 1957, Ser. No. 680,279
2 Claims. (Cl. 68—5)

This invention relates to apparatus for the continuous treatment of elongated goods in the form of webs or bands, more particularly textiles and paper in a vapour chamber. For such reactions, vapour chambers are usually employed and the goods to be treated are passed, in a plurality of loops, over a large number of guide rollers in said chambers. The vapour chambers are very costly because of their overall size and large power consumption. Since acid is injurious in many treatment processes, the vapour chamber has to be completely sealed off from its surroundings, and a great deal of time and money has to be devoted to fulfilling this requirement. A further disadvantage is that large quantities of goods are always present in these vapour chambers and can be overheated and rendered useless by an error of treatment or unexpected stoppage of the machine.

In contradistinction thereto, the present invention consists in that the goods to be treated, which have been printed or prepared with chemical substances and which may have been preheated or subjected to a preliminary vapour treatment, are passed by suitable means over a heated rotatable drum in a chamber filled with vapour and are stretched on the drum so that they do not slide thereon and the vapour surrounding the drum is used for initiating and carrying out a physical or chemical reaction of the substances, more especially dyestuffs, that are in or on the goods. Th goods can then be subjected to drying means and further treated in a suitable manner outside the vapour treatment chamber. The main idea on which the invention is based is that the goods to be treated are in close contact, over a large area, with the heated smooth drum shell and thereby in a very short time acquire the exact temperature required for the treatment, so that the duration of the treatment cycle is reduced to a minimum and the whole treatment can be controlled through the drum shell heating and the speed of rotation of the drum. When the material to be treated is thin, and when the treatment duration of the process in question in short, the drum can be rotated rapidly, or the diameter of the drum and the size of the vapour treatment chamber can be small.

For carrying the invention into effect there is provided an apparatus consisting essentially of a vapour treatment chamber and a heated drum rotatably mounted therein. The vapour treatment chamber should be only slightly larger than the drum, so that a very small volume of vapour is sufficient and a good flow of vapour round the drum is obtained. A preheating or preliminary vapour treatment means for the goods to be treated can be disposed in front of the vapour treatment chamber. There is also included heating and temperature regulating means for the drum and for the vapour treatment chamber. The rotatable heated drum is preferably formed as a double-walled drum and a hot liquid, for instance water, is pumped through the drum cavity and through the drum axis. By accurate adjustment of the temperature at the inlet and outlet of the heating liquid, the drum shell temperature can be very accurately adjusted to a required value. The heating of the drum may alternatively be effected in other known ways. The vapour treatment chamber may be kept at a particular temperature by regulating the supply of vapour or in other known ways.

From the above, it is apparent that the present apparatus also comprises the heating apparatus, more especially a pump installation, for the drum, and the regulating means for the vapour treatment chamber. Obviously, guiding rollers for the goods to be treated must also be present in the vapour treatment chamber, since the goods must extend about as large a portion of the drum periphery as possible. Inlet and outlet slots for the goods to be treated are also necessary, and any entry of outer air into the vapour treatment chamber is prevented in a known manner.

In accordance with the invention, contact heating by means of a rotatable drum in a confined vapour treatment chamber is used not only for producing the treatment temperature in the goods to be treated but also for accurate adjustment of a particular regulable temperature gradient between the vapour treatment chamber and the fabric. In this case, the invention is used for causing a part of the vapour to condense on and in the goods to be treated which have a lower temperature due to their contact with the drum. The condensate then penetrates into the goods, and this is of great advantage for various physical and chemical processes. The quantity of condensate to be formed on and in the goods is very accurately adjustable by regulation, in accordance with the invention, of the temperature both of the vapour and also, and more particularly, of the drum. Thus, by means of the present invention it is possible to obtain the optimum condensate precipitation required for a particular treatment process.

This is particularly important in the development and fixing of dyes in textiles, more especially of dyes printed onto the goods. The condensate settling on the goods dissolves these dyes and penetrates into the goods, taking the dye with it. The depth of penetration is particularly great when the present invention is used. Owing to the accurate quantitative regulability of the condensate precipitated, sharper colour outlines are also obtained, i.e. running of the colours is reliably prevented.

One embodiment, chosen by way of example, of a vapour treatment apparatus constructed in accordance with the invention is illustrated in the accompanying drawing.

An imperforate drum 5 heated by means of a heating agent or medium passing through a duct 4 is arranged in a vapour treatment box or chamber 1 which receives vapour through ducts 2 and has a vapour outlet at 3. The vapour is supplied from a source (not shown) and can be produced and maintained at a temperature of about 100° C. by means well known in the art. A valve V of conventional type is provided for the duct for regulating the amount of vapour passing through the duct. Removal of the heating agent is effected at 4a. A belt 6 is shown to indicate means for driving the drum. The goods to be subjected to vapour treatment, designated by the reference 7, run in the direction of the arrow into a slot 8 and are brought into contact with the periphery of the drum 5 by means of a roller 9. A further roller 10 is disposed immediately in front of an outlet slot 8' of the vapour treatment box. In practice, it is possible to provide a single slot serving both for the entry and for the exit of the goods.

In each case, the goods 7 are caused to cling tightly to the drum about substantially the whole of its periphery. Close contact of the goods with the heating drum 5 is a necessary feature of the invention.

The medium in the duct 4 may be heated to the desired temperature by an electric heater 13 whose current supply is indicated at 13a and the temperature adjustment and regulation is accomplished by means of a thermostat 14 which is connected to the current supply 13a by means of a switching relay (not shown). It can be seen that the heater 13 is suitably associated with the duct and other heaters such as gas, infra-red rays etc. may be used in lieu of an electric heater. The essential point is that the drum wall temperature can be accurately adjusted. The pump installation for the flow of the heating agent through the duct 4 is shown at P.

Because of the chemically active solvents used, and more especially in the fixing of dyes, the drum is provided with a protective coating, preferably of an acid-resistant metal. A coating of polytetrafluorethylene (Teflon), which is resistant to nearly all chemicals and becomes almost undetachably bonded to the drum shell, has been found particularly effective.

The drawing shows that the vapour treatment chamber surrounding the drum 5 is relatively small, and also that the vapour introduced through the ducts 2 is compelled to flow about the drum satisfactorily over the whole periphery thereof, until the excess vapour can flow away through the duct 3.

The vapour treatment box 1 is provided with a condensate discharge duct 11. In the upper part of the box 1, two heating plates 12 are indicated which are preferably formed as infra-red radiators and are used to regulate the temperature difference between the goods and the medium surrounding the drum. The temperature adjustment and regulation is effected by a thermostat 16 which is connected via a switching relay (not shown) with the heating plates 12 on the one hand and the valve V on the other hand. Current supply conductors for the heating plates are denoted 17 and 17a respectively. Additional means of this or other types can of course also be placed in other positions in the vapour treatment chamber. The form of the vapour treatment box, also, is not restricted to that shown in the drawing.

The manner of operation of the vapour treatment device constructed in accordance with the invention is as follows:

The dry fabric 7 printed with colour printing paste or padded with dye liquor passes through the slot 8 into the vapour treatment chamber 1 and is there brought into close contact with the heated drum by means of the roller 9 and is thereby quickly brought to a particular temperature several degrees lower than that of the vapour surrounding the drum. This causes a definite quantity of moisture to condense on the fabric. In accordance with the invention, this quantity can be very accurately adjusted by controlling the temperature difference. In this way, the reduction of the vat dyes is effected substantially more quickly and with less loss than when known methods are used, since the contact of the goods with the drum greatly accelerates the transmission of heat to the goods. With the known vapour treatment methods, this was not possible, since the goods have first to warm up slowly in the free vapour space and the reaction could then only begin after absorption of moisture. It was practically impossible to control the absorption of moisture at all. This resulted in long vapour treatment periods usually amounting to more than ten minutes.

In contradistinction thereto, in apparatus constructed in accordance with the invention, the correct measured quantity of vapour immediately settles on the goods as condensate without any loss of time, whereby the vapour treatment time can be reduced to about 10% of the former vapour treatment time.

The goods 7 finally emerge at 8'. The roller 10 provided there assists in producing the required close contact of the goods with the drum.

Moreover, by means of the present invention it is possible, owing to the accurate controllability of the condensate separation, to carry out the fixing of the dyes in such a manner that the outlines of the various colours are made sharp. With too little moisture, the colour development would not be complete, and with excessive vapour condensation the dyes would run. From this point of view also, a great advantage of the invention is that it permits accurate quantitative regulation of the vapour condensation.

A further important advantage of the invention is that the whole vapour treatment assembly can be made very small. The quantity of goods inside the vapour treatment assembly is less than one tenth of the quantity in the continuous roller steamer, and the vapour consumption is only a fraction of that of the continuous roller steamer.

The main advantage of the invention, however, is that the colour development takes place very much more rapidly than in the known apparatus. A long trial of the present invention and of the new vapour treatment device has shown that for colour fixing only sixty seconds, and in many cases even less, are required, instead of the period of about ten minutes that is needed when the continuous roller steamer is used.

These advantages represent exceptional progress in the fixing of dyes on and in textiles, which is not impaired by any disadvantages as compared with the known vapour treatment methods. On the contrary, the colouring effect is often about 20% deeper than with the continuous steaming method which has been usual heretofore, so that in many cases the quantity of dye required is very much smaller.

The invention, which consists mainly in the use of a regulably heated rotatable drum and more especially in the regulability of the ratio between the drum temperature and the vapour space temperature, is not applicable only to those cases in which the goods require a large quantity of moisture for fixing the dyes, i.e. more particularly for vat dyes on cotton and rayon, where the drum temperature thus has to be lower than the vapour space temperature, but the invention can also be used for synthetic and like fibres which have very little or no swelling capacity. In these cases, under certain circumstances, the drum temperature has to be substantially higher than the vapour space temperature, since the amount of water present in the vapour brings about the fixing of the dye, and this is accelerated by the higher drum temperature. Usually, however, in the treatment of synthetic fibrous materials, a temperature difference of only about 5°, for instance a drum temperature of 105° and a vapour temperature of 100°, will be sufficient.

Thus the ratio of the vapour temperature to the drum temperature may be but is not necessarily greater than 1. It may also be equal to or less than 1. The essential elements of the vapour treatment apparatus according to the invention are the same in all these cases.

I claim:

1. An apparatus for the continuous treatment of textile webs containing chemical substances such as dyestuffs and the like, comprising means defining a vapor chamber into which the textile web is conducted and in which a chemical reaction of the substance occurs, a hollow rotatable imperforate drum mounted within the treatment chamber and being of such dimensions as to substantially fill the treatment chamber, the imperforate characteristics of the drum preventing communication between said chamber and drum, means to impart rotary movement to the drum, a conduit means communicating with a heating medium and with the interior of the drum, heating means associated with said conduit means, pump means for circulating the heating medium through the conduit means and drum, further means for introducing a vapor into the chamber and removing the vapor from the chamber, adjustable thermostat means operably coupled with said heating means for maintaining the temperature of said drum at least equal to the temperature in said chamber, the treatment chamber being provided with at least one opening therein for allowing the web to enter and leave the treatment chamber, and means cooperable with the drum and web for maintaining the web tightly against the drum periphery throughout substantially the entire periphery of the drum.

2. An apparatus for the continuous treatment of textile webs containing chemical substances such as dyestuffs and the like, comprising means defining a treatment chamber in which a chemical reaction of the substances occurs, a hollow rotatable imperforate drum mounted within the treatment chamber and being of such dimensions as to substantially fill said chamber, the imperforate characteristics of the drum preventing communication between said chamber and drum, means to impart rotation to the drum, conduit means communicating with a heating medium and with the interior of the drum, heating means associated with said conduit means, pump means for circulating the heating medium through the conduit means and drum, the said treatment chamber being provided with an elongated slot permitting the textile web to enter the chamber and a second elongated slot spaced therefrom to allow the web to leave the chamber, guide rollers within the chamber in proximity to said slots and serving to maintain the web tightly against the drum periphery throughout substantially the entire periphery of the drum, means in communication with the interior of the chamber below the drum to introduce vapour therein whereby a chemical reaction on the substances in the web occurs within the chamber, adjustable thermostat means operably coupled with said heating means for maintaining the temperature of said drum at least equal to the temperature in said chamber, and vapour outlet means communicating with the chamber above the drum and at a point remote from the means introducing the vapour into the chamber so that the vapour flows about the entire periphery of the drum.

References Cited in the file of this patent

UNITED STATES PATENTS

| | | |
|---|---|---|
| 257,792 | Walker | May 9, 1882 |
| 757,104 | Fries | Apr. 12, 1904 |
| 759,980 | Fries | May 17, 1904 |
| 1,252,986 | Anders | Jan. 8, 1918 |
| 1,663,846 | Jacoby | Mar. 27, 1928 |
| 1,861,623 | Chapin | June 7, 1932 |
| 2,008,230 | Spooner | July 16, 1935 |
| 2,089,920 | Aubauer | Aug. 10, 1937 |
| 2,115,630 | Rehenburg | Apr. 26, 1938 |
| 2,487,197 | Stott | Nov. 8, 1949 |
| 2,488,208 | Lederer | Nov. 15, 1949 |
| 2,764,009 | Sarti | Sept. 25, 1956 |
| 2,789,063 | Purvis | Apr. 16, 1957 |
| 2,809,130 | Rappaport | Oct. 8, 1957 |

FOREIGN PATENTS

| | | |
|---|---|---|
| 408,180 | Great Britain | Apr. 5, 1934 |
| 687,928 | France | May 5, 1930 |
| 779,149 | Great Britain | July 17, 1957 |